United States Patent Office 3,223,914
Patented Dec. 14, 1965

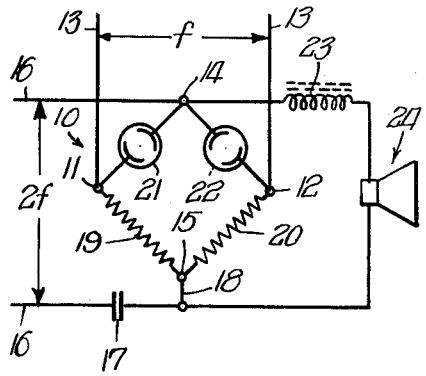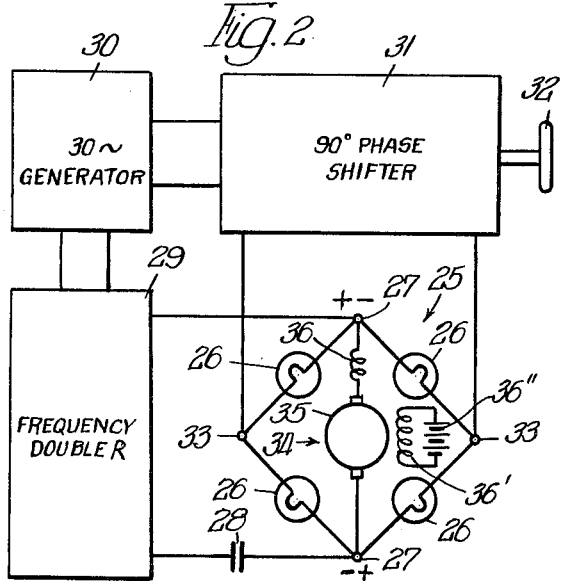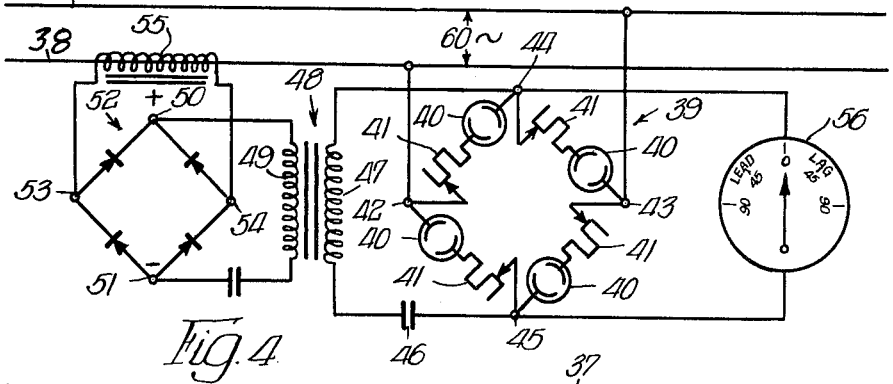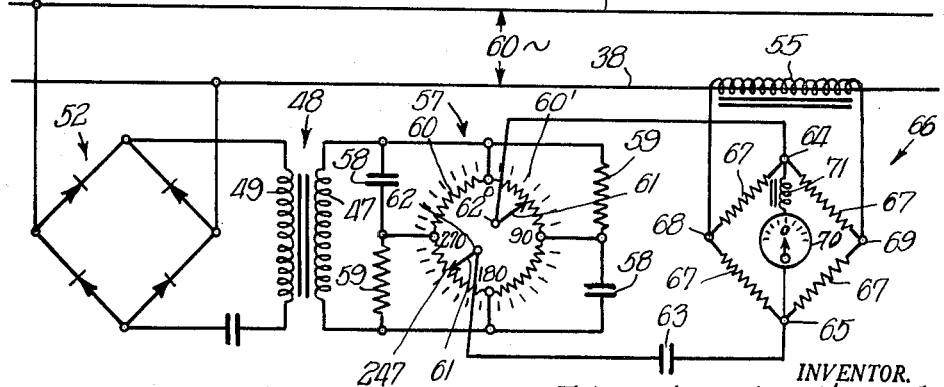
INVENTOR.
Edmund O. Schweitzer, Jr.,
BY Robert R. Lockwood
ATTY

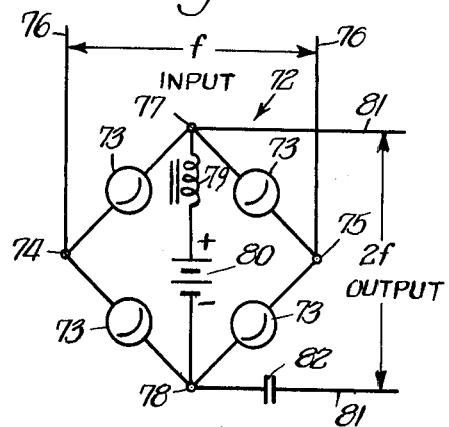
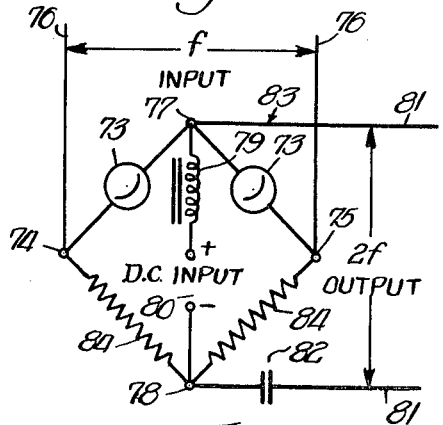
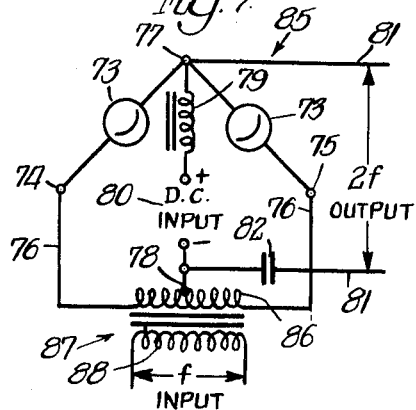
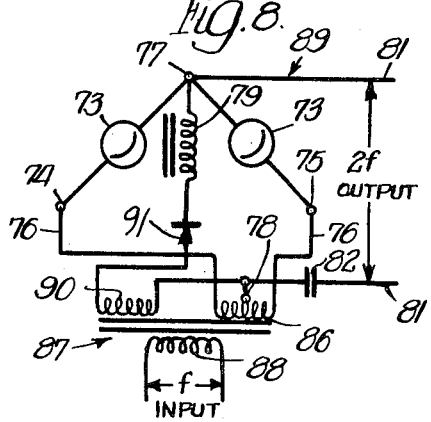
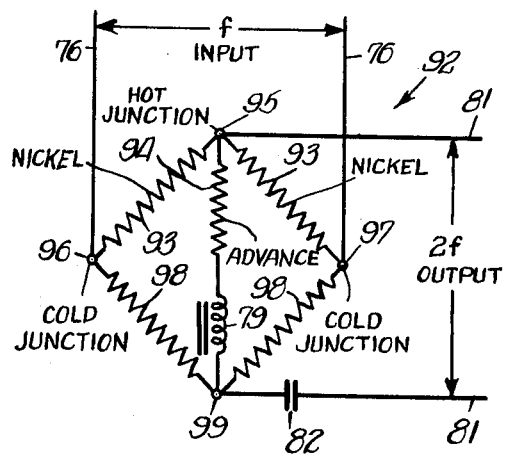

3,223,914
ELECTRIC CURRENT CONVERSION WITH A NONLINEAR RESISTANCE BRIDGE CIRCUIT
Edmund O. Schweitzer, Jr., 1002 Dundee Road, Northbrook, Ill.
Continuation of application Ser. No. 594,322, June 27, 1956. This application Feb. 21, 1962, Ser. No. 174,725
11 Claims. (Cl. 321—8)

This invention relates, generally, to electric current converting means and it has particular relation to converting alternating current to direct current and for converting direct current to alternating current or to doubling the frequency of a given alternating current. This application is a continuation of application Serial No. 594,322, filed June 27, 1956 which is a continuation-in-part of application Serial No. 576,564, filed April 6, 1956, now Patent No. 3,004,381, issued October 17, 1961.

Among the objects of this invention are: To convert a pair of alternating currents having a fixed relation to each other to direct currents; to vary the magnitude and direction of flow of the direct current by shifting the relative phase positions of the alternating currents; to employ the direct current output for operating a receiver, loud speaker, motor or like device requiring variations in magnitude of current flow or reversal of current flow for operation or for other purposes; to measure power factor of an alternating current in a new and improved manner; to double the frequency of a given alternating current; to convert direct current and alternating current of a given frequency into alternating current having double the given frequency; to employ for the last named conversion a bridge circuit having either a nonlinear resistor in each of the arms or in two adjacent arms in which case the other two arms comprise linear resistors; to employ one or more secondary windings of a transformer in combination with nonlinear resistors in adjacent arms of a bridge circuit to introduce into the circuit the given frequency; and to generate the direct current by means of thermocouples connected into the bridge circuit.

Other objects of this invention will, in part, be obvious and in part appear hereinafter.

This invention is disclosed in the embodiments thereof shown in the accompanying drawings and it comprises the features of construction, method of operation, combination of elements and arrangement of parts that will be exemplified in the construction and method hereinafter set forth and the scope of the application of which will be indicated in the appended claims.

For a more complete understanding of the nature and scope of this invention, reference can be had to the following detailed description, taken together with the accompanying drawings, in which:

FIGURE 1 illustrates, diagrammatically, a portion of one of the receiving circuits described in the applications above referred to in which the present invention is incorporated;

FIGURE 2 illustrates, diagrammatically, how the bridge circuit of the present invention, having nonlinear current conducting devices in each of the branches, can be employed for controlling the operation of a device such as an electric motor;

FIGURE 3 shows, diagrammatically, how the bridge circuit employing devices having nonlinear conducting characteristics in the branches can be employed for indicating the power factor of an alternating current circuit;

FIGURE 4 shows a modification of the power factor indicating system illustrated in FIGURE 3;

FIGURE 5 shows, diagrammatically, how the bridge circuit of the present invention can be employed for doubling the frequency of a given alternating current or for the production of alternating current on the application of direct current;

FIGURE 6 shows a modification of the circuit illustrated in FIGURE 5 and making use of only two nonlinear resistors;

FIGURE 7 illustrates, diagrammatically, how the alternating current of a given frequency can be introduced into the bridge circuit through a transformer with the secondary winding having sections in two of the arms of the bridge circuit;

FIGURE 8 is a modification of the circuit shown in FIGURE 7 and illustrates how a rectifier can be employed for obtaining the direct current from the transformer; and FIGURE 9 illustrates how the direct current can be obtained by the use of dissimilar metals connected in the bridge circuit and providing hot and cold junctions.

It is described in Patent No. 3,004,381 above referred to how the phase of a fundamental frequency can be shifted relative to its second harmonic for the purpose of transmitting signals from one point to another. For example, speech can be transmitted by shifting one of these frequencies with respect to the other. At the receiver for such a system means are provided for reconverting the phase shifted frequencies into audible sounds. That portion of the receiving circuit is illustrated in FIGURE 1 of the drawings where the reference character 10 designates, generally, a bridge circuit having four arms and provided with opposite terminals 11 and 12 which are connected by conductors 13 to a source of alternating current having a frequency $f$ as indicated. For illustrative purposes it is pointed out that the frequency of this alternating current may be 2500 cycles per second, although it will be understood that other frequencies can be employed.

The remaining pair of terminals 14 and 15 of the bridge circuit 10 are connected by conductors 16 to a source of alternating current having a frequency twice that of the fundamental frequency applied to the conductors 13 and it is indicated at $2f$. This double frequency or second harmonic may be 5000 cycles per second where the fundamental frequency is 2500 cycles per second. It is important that the two frequencies $f$ and $2f$ bear a fixed relation to each other. In one of the conductors 16 a capacitor 17 is connected to limit or prevent the flow of direct current in this circuit. A tap 18 is provided for connecting to linear resistors 19 and 20 which therewith function as a potentiometer for balancing the bridge circuit 10.

The other two arms of the bridge circuit between which the terminal 14 is located are formed by nonlinear resistors 21 and 22 and are shown as space discharge devices such as neon tubes. Other devices that can be used which have nonlinear current characteristics are germanium diodes and thyrite varistors, such as silicon carbide resistor elements. Also, thermionic tubes can be used. As a matter of fact, any device having a nonlinear current carrying characteristic, either positive or negative, can be employed provided the device is sufficiently responsive for the frequency applied thereto in order to provide the converting or operating characteristics that are required for changing the fundamental and second harmonics applied to the bridge circuit to direct current or, when the fundamental and direct current are applied for providing the second harmonic. As will be pointed out hereinafter, where lower frequencies, such as frequencies of the order of 60 cycles per second, are applied to the bridge circuit, it is possible to employ other devices, such as tungsten filament lamps in lieu of the space discharge devices 21 and 22. However, tungsten is too slow in response for use at the higher frequencies such as frequencies of the order of 2500 cycles per second.

Since direct current flows between the terminals 14 and 15 or between the terminal 14 and the tap 18 and since, for the particular arrangement illustrated in FIGURE 1 when it is used in conjunction with the receiving circuit described in Patent No. 3,004,381 above referred to, it is a function of the original voice frequency and, when reproduced, reproduces the original tones, provision is made for taking advantage of this result. Accordingly, the terminal 14 and the tap 18 are connected through a reactor 23 and a loud speaker or receiver 24. The reactor 23 is employed to limit or prevent the flow of the second harmonic into the loud speaker or receiver 24. If its reactance is sufficiently high, the separate reactor 23 can be omitted.

Referring now particularly to FIGURE 2 of the drawings, it will be observed that the reference character 25 refers to a bridge circuit which is similar to the bridge circuit 10 shown in FIGURE 1 and described hereinbefore. The bridge circuit 25 is somewhat different in that it employs four devices 26, one in each arm, which have nonlinear current carrying characteristics. In this instance it is desired to obtain a substantial amount of power from the bridge circuit 25 and to employ relatively low frequency for producing the required amount of direct current. For this purpose it is possible to use tungsten filament lamps or thyrite varistors for the devices 26. The direct current terminals 27 of the bridge are connected through a capacitor 28 to a source 29 of double frequency, for example, a frequency of 60 cycles per second. The source 29 is a frequency doubler which is energized from a source 30 of alternating current, such as a 30 cycle generator. Provision is made by means of a 90° phase shifter 31 for shifting the phase of the 30 cycle current with respect to the second harmonic or output of the frequency doubler 29. A hand wheel 32 is employed for manual control. It will be understood that the phase shifter 31 may be of the type described in the above application for shifting the phase through 360° but arranged merely to employ only one-fourth of its range since a complete reversal of the polarity applied to the terminals 27 can be obtained through a 90° phase shift as will be understood readily. The output from the phase shifter 31 is applied to the terminals 33 of the bridge 25. It will be understood that the phase of the second harmonic from the frequency doubler 29 can be shifted with respect to the phase of the output of the 30 cycle generator 30, if desired.

A load device, such as a direct current motor shown generally at 34, is connected between the terminals 27. It may include an armature 35 and a series field winding 36 connected in series circuit relation therewith. In addition, a separately excited field winding 36' is employed and is energized from a suitable direct current source, such as a battery 36".

By shifting the position of the phase shifter 31 by the hand wheel 32 or other suitable means, it is possible to change the magnitude and polarity of the direct current flowing between the terminals 27 and thus to change the speed and direction of rotation of the armature 35.

It is possible to omit two of the nonlinear devices 26 from the bridge 25 and employ in lieu thereof resistors or a potentiometer as shown in FIGURE 1. However, the output of the bridge is decreased by over fifty percent if only two of the nonlinear current conducting devices 26 are used.

Referring to FIGURE 3 of the drawings, it will be observed that a system is there provided for indicating the power factor of an alternating current circuit such as a 60 cycle circuit represented by the conductors 37 and 38. For this purpose a bridge 39 is employed which is similar to the bridge 10, FIGURE 1, and the bridge 25, FIGURE 2. Here the bridge 39 is provided with a nonlinear current conducting device 40 in each of its branches. For example, a neon tube can be used since only a relatively small amount of current is to be drawn from the bridge 39. A potentiometer 41 is provided in each of the arms of the bridge 39 in order to permit individual adjustment for balancing purposes. The terminals 42 and 43 of the bridge are connected to the conductors 38 and 37, respectively, as indicated, and thus these terminals are energized with the fundamental frequency. The double frequency is applied to the terminals 44 and 45 through a capacitor 46 from a secondary winding 47 of the transformer 48 which has a primary winding 49 that is connected across the direct current terminals 50 and 51 of a rectifier bridge 52. The terminals 53 and 54 of the rectifier bridge 52 are connected for energization across a secondary winding 55 which is associated with the line conductor 38 which functions as a single turn primary winding. It will be understood that half cycles of the same polarity are applied to the primary winding 49 of the trnnsformer 48 and thus the output of the secondary winding 47 is an alternating current having a frequency of 120 cycles per second.

Across the terminals 44 and 45 of the bridge 39 a power factor indicator 56 is connected. In reality the power factor indicator 56 is a D'Arsonval type instrument, having substantial inductance, and is provided with a scale which has a zero center and is calibrated in degrees of power factor, leading and lagging, as indicated. Since the power factor indicator 56 has substantial inductance, the flow of double frequency current therethrough is limited or substantially prevented and only direct current flows therethrough.

In the system, as shown in FIGURE 3, the fundamental frequency which is applied to the terminals 42 and 43 of the bridge circuit 39 is derived as a function of the voltage across the conductors 37 and 38 while the second harmonic, which is applied across the terminals 44 and 45, is derived from the current flow in these conductors. It will be understood that these functions can be reversed and fundamental frequency derived from the current flow in the conductors 37 and 38 and the second harmonic derived from the voltage therebetween.

In FIGURE 4 of the drawings there is shown a modification of the power factor measuring system of FIGURE 3. In this modification a null method of operation is employed and the rectifier bridge 52 is energized from the potential between the conductors 37 and 38. As before, the output of the rectifier bridge 52 is applied to a primary winding 49 of a transformer 48. In this instance the secondary winding 47 is connected to energize a phase shifter, shown generally at 57, which is capable of effecting a 360° phase shift and is described in more detail in the application above referred to. It includes capacitors 58 and linear resistors 59 connected in opposite arms of a bridge circuit which is energized, as shown in the drawing, from the secondary winding 47. A potentiometer resistor 60 is interconnected at diametrically opposite points to the four terminals of the bridge circuit and contact arms 61 are employed for engaging the same. Connection to the contact arms 61 is provided by slip rings 62 and it will be understood that the contact arms 61 are moved conjointly so that they always engage the potentiometer resistor 60 at locations 180° apart. The contact arms 61 are connected through a capacitor 63 to terminals 64 and 65 of a bridge circuit that is shown generally at 66. The bridge circuit 66 is made up of nonlinear resistors 67. For example, they may be varistors such as Thyrite formed of silicon carbide fused in clay. The terminals 68 and 69 of the bridge circuit 66 are connected across the secondary winding 55 which, as before, is inductively related to the conductor 38. A zero center galvanometer 70 is connected to an inductor 71 between the terminals 64 and 65. The choke or inductor 71 is employed to reduce the ripple resulting from the alternating current at double frequency which is applied to the terminals 64 and 65 and thus limits or prevents the flow of alternating current through the galvanometer 70. It is a zero center device for indicating when the bridge 66 is in balance.

The bridge 66 is balanced by adjusting the position of the arms 61 along the potentiometer resistor 60 and relative to a scale 60' which can be calibrated, as indicated, from zero through 360°. It will be understood that the position of the arms 61 is adjusted until the pointer of the galvanometer 70 is in zero position. Then the reading on the scale 60' indicates the power factor of the circuit comprising the conductors 37 and 38 when the same are energized with alternating current.

When the null method is employed for measuring power factor and the bridge 66 is made up of resistors whose resistance increases with increase in temperature, the null indication is obtained when the fundamental and double frequencies are in phase. Such a resistor is one formed of tungsten such as a tungsten filament lamp. When neon lamps are employed for the nonlinear resistance devices, the resistance decreases with increase in current flow. Then the null indication is obtained when the current and voltage or the fundamental and second harmonic are 90° out of phase with each other.

The systems as shown in FIGURES 1–4 of the drawings employ the bridge circuit with two or four nonlinear current carrying conducting devices for obtaining direct current as a result of the application to the bridge circuit of a fundamental frequency and its second harmonic. The same bridge circuit can be employed as a frequency doubler. For this purpose the fundamental frequency is applied to the bridge as before and, in addition, a source of direct current is connected to energize the other two terminals of the bridge circuit. The result is a second harmonic or double frequency across these terminals. A circuit connected thereto including a capacitor effectively prevents the flow of direct current therein and permits the use of the double frequency alternating current for whatever purpose is desired. Sufficient inductance is connected in series with the direct current source to prevent the flow therethrough of alternating current. The systems as shown in FIGURES 5–9 of the drawings show how the second harmonic can be obtained in the manner just generally described.

Referring now particularly to FIGURE 5 of the drawings, it will be observed that the reference character 72 designates, generally, a bridge circuit having four arms in each of which there is a nonlinear resistor 73. For simplicity a symbol has been adopted to represent a nonlinear resistor comprising a circle having therein a portion of a curve showing a rising characteristic. It will be understood, from what has been indicated hereinbefore, that the resistor employed may have a positive or a negative coefficient, depending upon the type of material that is used, the essential characteristic being that the resistor has nonlinear current carrying characteristics.

One pair of opposite terminals 74 and 75 of the bridge circuit 72 are connected by conductors 76 to a source of alternating current indicated at $f$. This source may be a 60 cycle 110 volt source. The other or remaining pair of terminals 77 and 78 are connected through a choke or inductor 79 to a source of direct current 80 such as a battery. Then there appears between the remaining pair of terminals 77 and 78 an alternating current having a frequency which is double that of the frequency $f$. Conductors 81, having a capacitor 82 connected in one of them, are connected to the terminals 77 and 78 to provide a circuit in which only the second harmonic $2f$ appears. One use to which the bridge circuit 72 can be put is to detect the presence of direct current between the terminals 77 and 78 by noting the presence of a current of double frequency in the conductors 81.

FIGURE 6 of the drawings shows a modification of the system shown in FIGURE 5. Here a bridge circuit 83 is employed which uses only two nonlinear resistors 73, one in each of two adjacent legs or arms of the bridge circuit. The other two arms of the bridge circuit are formed by linear resistors 84. Otherwise the arrangement is identical with that shown in FIGURE 5.

In FIGURE 7 of the drawings a bridge circuit 85 is illustrated in which only two nonlinear resistors 73 are employed. In the other two arms of the bridge circuit sections of a secondary winding 86 are employed, the terminals of this secondary winding being connected, as shown, to the terminals 74 and 75. The winding 86 forms a part of a transformer, shown generally at 87, having a primary winding 88 that is arranged to be energized with the fundamental frequency $f$. Otherwise the circuit is similar to the circuits illustrated in FIGURES 5 and 6 of the drawings. While the direct current source 80 can be a battery, as illustrated in FIGURE 5, other means can be employed such as a dynamo electric generator, if desired.

FIGURE 8 shows a modification of the system shown in FIGURE 7. Here a bridge circuit 89 is illustrated and the transformer 87 is shown as having another secondary winding 90 which is inductively related to the primary winding 88. Connected in series circuit relation with the secondary winding 90 is a rectifier 91 which can be employed to provide the direct current for cooperating with the fundamental frequency to provide the double harmonic $2f$ in the circuit comprising the conductors 81.

A further modification of the frequency doubler is illustrated in FIGURE 9. There a bridge circuit, shown generally at 92, is formed in part by two arms 93 of nickel and connected thereto is a resistor 94 of advance metal. The terminal or connection 95 between the arms 93 of nickel and resistor 94 of advance metal constitutes a hot junction of a thermocouple. The other terminals 96 and 97 of the arms 93 constitute cold junctions and connected thereto are resistors 98 having linear current carrying characteristics. The remaining terminal 99 of the bridge has one terminal of the choke or inductor 79 connected thereto, the other terminal of which is connected to the resistor 94. On the application of the fundamental frequency $f$ to the conductors 76, a second harmonic thereof appears between the conductors 81.

Since certain further changes can be made in the foregoing systems and method and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In combination, a first source of alternating current, a second source of alternating current having a frequency twice that of said first source, a load device, a four arm bridge circuit having in at least each of two adjacent arms a nonlinear resistance device capable of conducting current in one direction or the other, circuit means connecting a pair of opposite terminals of said bridge circuit across said first source, circuit means connecting the remaining pair of opposite terminals of said bridge circuit at least one of which is between said nonlinear resistance devices across said second source, and circuit means connecting said remaining pair of opposite terminals across said load device for flow therethrough of direct current.

2. In combination, a first source of alternating current, a second source of alternating current having a frequency twice that of said first source, a load device, a four arm bridge circuit having in at least each of two adjacent arms a nonlinear resistance device capable of conducting current in one direction or the other, circuit means connecting a pair of opposite terminals of said bridge circuit across said first source, circuit means connecting the remaining pair of opposite terminals of said bridge circuit at least one of which is between said nonlinear resistance devices across said second source, circuit means connecting said remaining pair of opposite terminals across said load device for flow therethrough of direct current, and means for shifting the phase of one of said alternating currents with respect to the phase of the other alternating current to vary the magnitude of said direct current.

3. In combination, a first source of alternating current, a second source of alternating current having a frequency twice that of said first source, a load device, a four arm bridge circuit having in at least each of two adjacent arms a nonlinear resistance device capable of conducting current in one direction or the other, circuit means connecting a pair of opposite terminals of said bridge circuit across said first source, circuit means connecting the remaining pair of opposite terminals of said bridge circuit at least one of which is between said nonlinear resistance devices across said second source, circuit means connecting said remaining pair of opposite terminals across said load device for flow therethrough of direct current, and means for shifting the phase of one of said alternating currents with respect to the phase of the other alternating current to vary the magnitude and direction of flow of said direct current.

4. In combination, a first source of alternating current, a second source of alternating current having a frequency twice that of said first source, a load device, a four arm bridge circuit having in each arm a nonlinear resistance device capable of conducting current in one direction or the other, circuit means connecting a pair of opposite terminals of said bridge circuit across said first source, circuit means connecting the remaining pair of opposite terminals of said bridge circuit across said second source, and circuit means connecting said remaining pair of opposite terminals across said load device for flow therethrough of direct current.

5. In combination, a first circuit energized with alternating current, a second circuit energized with alternating current having a frequency twice that of said first circuit, a third circuit energized with direct current, and a four arm bridge circuit having in at least each of two adjacent arms a nonlinear resistance device capable of conducting current in one direction or the other, said first circuit being connected across said bridge circuit to a pair of opposite terminals, said second circuit and said third circuit being connected across said bridge circuit to the remaining pair of terminals at least one of which is between said nonlinear resistance devices.

6. In combination, a first circuit energized with alternating current, a second circuit energized with alternating current having a frequency twice that of said first circuit, a third circuit energized with direct current, a four arm bridge circuit having in at least each of two adjacent arms a nonlinear resistance device capable of conducting current in one direction or the other, said first circuit being connected across said bridge circuit to a pair of opposite terminals, said second circuit and said third circuit being connected across said bridge circuit to the remaining pair of terminals at least one of which is between said nonlinear resistance devices, a capacitor interposed in said second circuit to limit the flow of direct current therein, and an inductor interposed in said third circuit to limit the flow of alternating current therein.

7. In combination, a first circuit energized with alternating current, a second circuit energized with alternating current having a frequency twice that of said first circuit, a third circuit energized with direct current, a four arm bridge circuit having in at least each of two adjacent arms a nonlinear resistance device capable of conducting current in one direction or the other, said first circuit being connected across said bridge circuit to a pair of opposite terminals, said second circuit and said third circuit being connected across said bridge circuit to the remaining pair of terminals at least one of which is between said nonlinear resistance devices, blocking means interposed in said second circuit to limit the flow of direct current therein, and blocking means interposed in said third circuit to limit the flow of alternating current therein.

8. In combination, a first source of alternating current, a second source of alternating current having a frequency twice that of said first source, a load device, a four arm bridge circuit having in at least each of two adjacent arms a nonlinear resistance device capable of conducting current in one direction or the other, circuit means connecting a pair of opposite terminals of said bridge circuit across said first source, circuit means connecting the remaining pair of opposite terminals of said bridge circuit at least one of which is between said nonlinear resistance devices across said second source, circuit means connecting said remaining pair of opposite terminals across said load device for flow therethrough of direct current, and blocking means interposed in the second mentioned circuit means to limit the flow of direct current therein.

9. In combination, a first source of alternating current, a second source of alternating current having a frequency twice that of said first source, a load device, a four arm bridge circuit having in at least each of two adjacent arms a nonlinear resistance device capable of conducting current in one direction or the other, circuit means connecting a pair of opposite terminals of said bridge circuit across said first source, circuit means connecting the remaining pair of opposite terminals of said bridge circuit at least one of which is between said nonlinear resistance devices across said second source, circuit means connecting said remaining pair of opposite terminals across said load device for flow therethrough of direct current, blocking means interposed in the second mentioned circuit means to limit the flow of direct current therein, and blocking means interposed in the third mentioned circuit means to limit the flow of alternating current therein.

10. Method of converting alternating current to direct current which comprises: generating two alternating currents with the frequency of one at least equal to twice that of the other, combining said alternating currents through nonlinear resistance means capable of conducting current in one direction or the other, obtaining direct current from the combination, while maintaining the generation of one of said alternating currents at its frequency varying the phase of the other alternating current with respect to that of the one to vary the magnitude of the direct current, and then restoring the frequency of the other alternating current to its original frequency.

11. Method of converting alternating current to direct current which comprises: generating two alternating currents with the frequency of one at least equal to twice that of the other, combining said alternating currents through nonlinear resistance means capable of conducting current in one direction or the other, obtaining direct current from the combination, while maintaining the generation of said one alternating current at its frequency varying the phase of said other alternating current through ninety degrees with respect to the phase of said one alternating current to vary the polarity and magnitude of the direct current, and then restoring the frequency of said other alternating current to its original frequency.

References Cited by the Examiner

UNITED STATES PATENTS

| | | | |
|---|---|---|---|
| 2,414,317 | 1/1947 | Middel | 307—88.5 |
| 2,608,650 | 8/1952 | Myers | 332—47 |
| 2,778,988 | 1/1957 | Pihl | 323—75 |

FOREIGN PATENTS 502,414   11/1954   Italy.

MILTON O. HIRSHFIELD, *Primary Examiner.*